(12) United States Patent
Kubo et al.

(10) Patent No.: US 7,978,146 B2
(45) Date of Patent: Jul. 12, 2011

(54) COIL ANTENNA AND PORTABLE ELECTRONIC APPARATUS

(75) Inventors: Hiroyuki Kubo, Kusatsu (JP); Hiromitsu Ito, Hakusan (JP); Kuniaki Yosui, Kanazawa (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 437 days.

(21) Appl. No.: 12/123,548

(22) Filed: May 20, 2008

(65) Prior Publication Data

US 2008/0252551 A1 Oct. 16, 2008

Related U.S. Application Data

(63) Continuation of application No. PCT/JP2006/320179, filed on Oct. 10, 2006.

(30) Foreign Application Priority Data

Nov. 22, 2005 (JP) ................................. 2005-337216

(51) Int. Cl.
  *H01Q 21/00* (2006.01)
(52) U.S. Cl. ........................ 343/867; 343/702; 343/895
(58) Field of Classification Search .................. 343/702, 343/867, 895
  See application file for complete search history.

(56) References Cited

U.S. PATENT DOCUMENTS

| | | | | |
|---|---|---|---|---|
| 6,456,246 | B2 * | 9/2002 | Saito | ............................... 343/702 |
| 7,710,341 | B2 * | 5/2010 | Kubo et al. | ................... 343/788 |
| 2001/0040531 | A1 | 11/2001 | Saito | |
| 2005/0153755 | A1 | 7/2005 | Suzuki et al. | |

FOREIGN PATENT DOCUMENTS

| | | |
|---|---|---|
| EP | 0 923 153 A1 | 6/1999 |
| EP | 1 120 855 A2 | 8/2001 |
| EP | 1 555 717 A1 | 7/2005 |
| JP | 8-191209 A | 7/1996 |
| JP | 2000-201442 A | 7/2000 |
| JP | 2001-284935 A | 10/2001 |
| JP | 2004-126750 A | 4/2004 |

OTHER PUBLICATIONS

Official Communication issued in corresponding European Patent Application No. 06811492.5, mailed on Apr. 7, 2010.
Official communication issued in counterpart European Application No. 06811492.5, mailed on Dec. 12, 2008.
Official communication issued in the International Application No. PCT/JP2006/320179, mailed on Jan. 16, 2007.
Official Communication issued in corresponding European Patent Application No. 06811492.5, mailed on Oct. 27, 2009.
Official Communication issued in corresponding Japanese Patent Application No. 2007-546375, mailed on Jan. 18, 2011.

* cited by examiner

*Primary Examiner* — Tan Ho
(74) *Attorney, Agent, or Firm* — Keating & Bennett, LLP

(57) ABSTRACT

Coil units including windings are disposed on opposite sides across a virtual center line that is substantially perpendicular to a direction of positional displacement of a portable electronic apparatus that is to be disposed close to a reader/writer. The windings are connected in series through a conductor such that winding directions of the windings are the same. A difference in the communication performance between a case where the portable electronic apparatus is brought closer to a central portion of the reader/writer and a case where the portable electronic apparatus is brought closer to a position that is deviated from the central portion of the reader/writer can be reduced. In particular, even in a case where the portable electronic apparatus is brought closer to a peripheral portion of the reader/writer, a predetermined maximum possible communication range can be ensured.

6 Claims, 4 Drawing Sheets

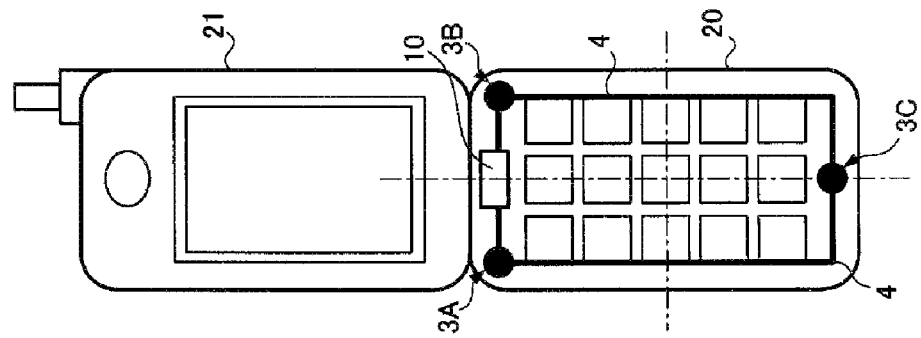
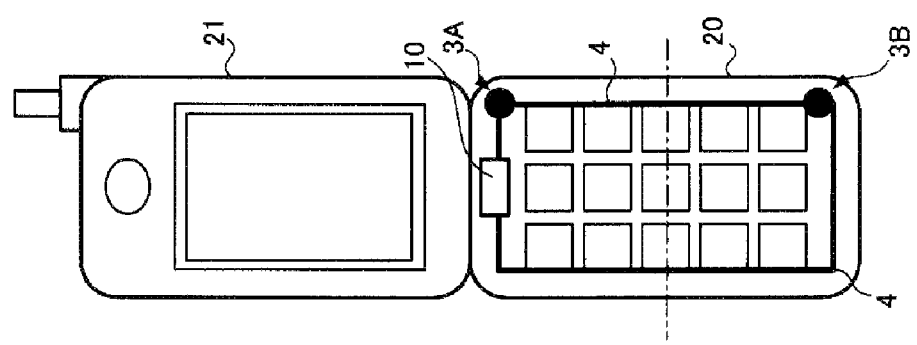
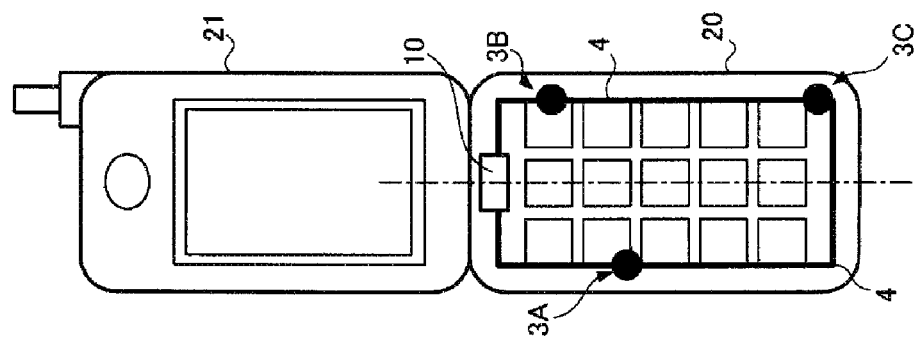
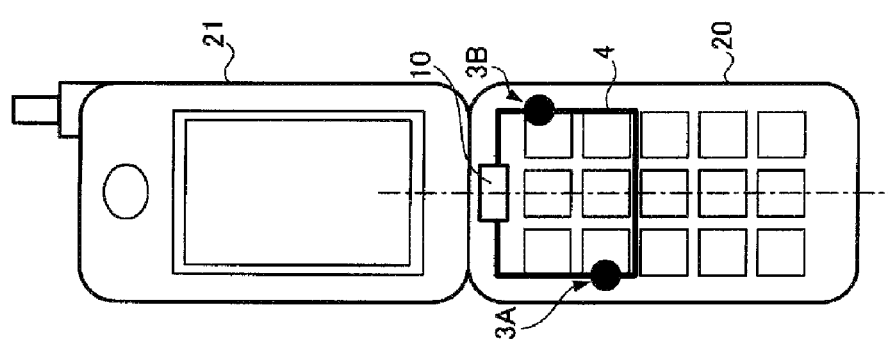
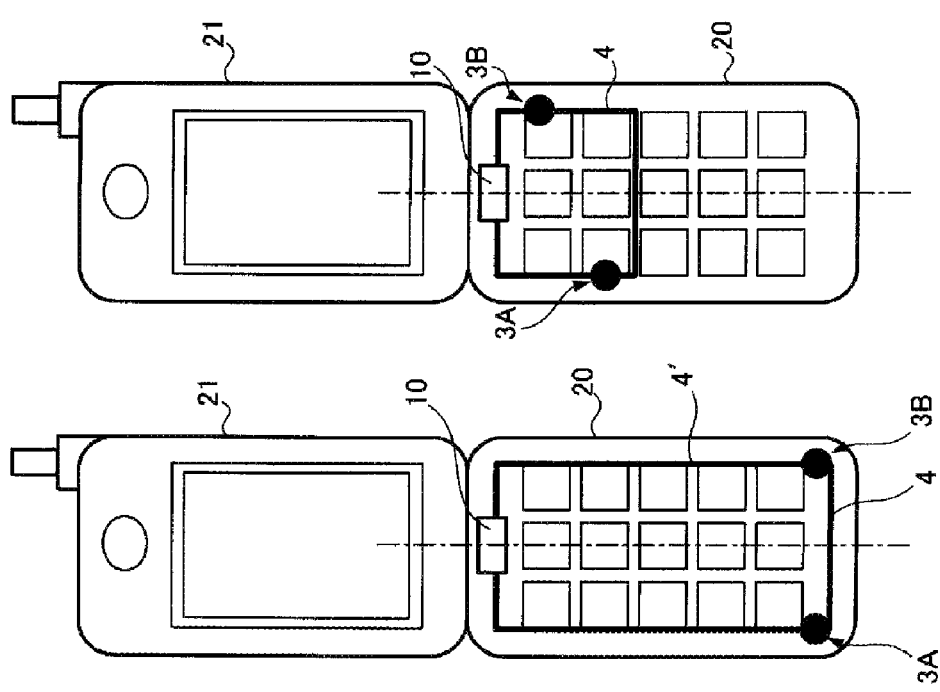

COIL ANTENNA AND PORTABLE ELECTRONIC APPARATUS

BACKGROUND OF THE INVENTION

1. Field of the Invention

The present invention relates to a coil antenna preferably to be provided in a portable electronic apparatus and a portable electronic apparatus including the coil antenna.

2. Description of the Related Art

RFID (Radio Frequency Identification: non-contact data identification technology, radio-wave system recognition) systems using non-contact IC cards or IC tags have been introduced in various fields, such as automatic train-ticket gates, security systems for entering and leaving buildings, and electronic money systems, for example.

Such an RFID system includes a non-contact IC card, which includes an IC chip and a planar coil to be used for data transmission/reception and data storing, and a reader/writer for writing and reading data to and from the non-contact IC card. Magnetic flux from the reader/writer passes through the planar coil, so that communication between the non-contact IC card and the reader/writer can be performed.

In recent years, a technology for communication between a cellular phone including an IC chip, instead of a non-contact IC card in the above-described RFID system, and a reader/writer have become commonplace.

In a cellular phone including such an IC chip, a coil antenna having a large loop area or a coil antenna formed by winding a coil around a magnetic core is disposed in a casing of the cellular phone. Thus, such a cellular phone is disposed close to an antenna of a reader/writer so that magnetic flux from the antenna of the reader/writer can pass through the coil of the coil antenna.

In a cellular phone or other suitable electronic component including such a non-contact IC card chip, the planar coil is provided on one of the surfaces of the casing of the cellular phone. However, since a circuit board including a ground electrode, a metallic battery case, and other components are provided inside the cellular phone, it is difficult to cause magnetic flux to pass through the planar coil. Thus, there is a problem of not achieving a wide communication range. In addition, for example, in a case in which the cellular phone is disposed close to the reader/writer such that the front and back sides of the cellular phone are inverted from an intended orientation, communication may not be performed at all. Accordingly, there is a problem of variations in sensitivity, depending on the orientation of the cellular phone.

A non-contact IC card (an RFID medium) which efficiently receives necessary electric power is disclosed in Japanese Unexamined Patent Application Publication No. 2000-201442. The non-contact IC card described in Japanese Unexamined Patent Application Publication No. 2000-201442 includes a communication antenna, which transmits and receives data and signals without contact, and a plurality of receiving coils. In a state in which the receiving coils face feeding coils with gaps therebetween, electromagnetic induction is generated between the receiving coils and the feeding coils. In the case of receiving power, the receiving coils receive a power supply from the feeding coils without contact by the electromagnetic induction.

In addition, an RFID medium which provides communication between a reader/writer and the RFID medium even when the RFID medium is disposed in a direction that is perpendicular to a coil antenna of the reader/writer is described in Japanese Unexamined Patent Application Publication No. 2004-126750.

The configuration of a non-contact IC tag disclosed in Japanese Unexamined Patent Application Publication No. 2004-126750 is shown in FIG. 1. In the non-contact IC tag, an IC module 210 to and from which information is externally written and read and a conductive antenna unit 220 for supplying electric power to the IC module 210 using electromagnetic induction from a reader/writer and for performing writing and reading of information to and from the IC module 210 are provided on a base member 250, which is a resin sheet, for example. The antenna unit 220 is connected to the IC module 210 such that two coil antennas 221a and 221b are connected in series so as to have a figure eight shape.

However, for such a known RFID medium, when communication is performed to authenticate a user, billing and settlement, or other suitable purposes by moving a portable electronic apparatus close to a reader/writer, the communication performance (communication range) greatly changes, depending on the location of a communication antenna provided in the portable electronic apparatus, that is, depending on whether the communication antenna is close to a central portion of the reader/writer or close to a location spaced from the central portion (i.e., a location displaced from the central portion) of the reader/writer. This change causes a problem of a reduction in the communication range where an RFID medium is close to a peripheral portion of a reader/writer.

With the non-contact IC card described in Japanese Unexamined Patent Application Publication No. 2000-201442, providing a plurality of receiving coils in the RFID medium increases the power reception efficiency. However, since only a single communication antenna coil is provided in the non-contact IC card, a problem of deterioration in the communication performance in a case where the RFID medium is brought closer to a reader/writer such that the position of the RFID medium is deviated from the reader/writer cannot be solved.

In addition, Japanese Unexamined Patent Application Publication No. 2004-126750 is designed in order to provide a predetermined communication range even when the positional relationship between an RFID medium and a reader/writer is changed from a known direction in which the RFID medium and the reader/writer face each other to a direction in which the RFID medium and the reader/writer are substantially perpendicular to each other. Thus, Japanese Unexamined Patent Application Publication No. 2004-126750 still has a problem of deterioration in the communication performance when the RFID medium is moved close to the reader/writer such that the location of the RFID medium is deviated from the reader/writer. Furthermore, since a plurality of antenna coils are connected in series such that the winding directions of the antenna coils are opposite to each other, when magnetic fluxes pass through both coils, induction currents cancel each other, resulting in a relatively narrow communication range.

SUMMARY OF THE INVENTION

To overcome the problems described above, preferred embodiments of the present invention provide a coil antenna that reduces a difference in communication performance between a case in which a portable electronic apparatus, which includes the coil antenna, is disposed close to a central portion of a reader/writer and a case in which the portable electronic apparatus is disposed close to a location deviated from the central portion (i.e., displaced from the central portion) of the reader/writer and, in particular, that solves a problem of a reduction in a communication range where the portable electronic apparatus is disposed close to a peripheral portion of the reader/writer and to provide a portable electronic apparatus including such a coil antenna.

A coil antenna according to a preferred embodiment of the present invention includes a plurality of coil units, each of the plurality of coil units including a winding, wherein the winding of one of the plurality of coil units and the winding of another of the plurality of coil units are disposed on opposite sides of a virtual center line extending in one of a long-axis direction and a short-axis direction of main surfaces of a casing of a portable electronic apparatus, the casing having a plate shape and having a first main surface and a second main surface that faces the first main surface and is substantially parallel to the first main surface, and the windings of the plurality of coil units are connected to each other by a conductor such that winding directions of the windings of the plurality of coil units are the same.

A coil axis of each of the windings of the plurality of coil units is preferably substantially perpendicular to the main surfaces of the casing.

The conductor is preferably disposed in a peripheral portion along a side of the casing.

According to preferred embodiments of the present invention, since the coil units are disposed on opposite sides of a virtual center line of a casing of an electronic apparatus including a coil antenna, and windings of the coil units are connected in series through a conductor such that the winding directions of the windings of the coil units are the same, even when the location of the portable electronic apparatus that is disposed close to a reader/writer is deviated from a central portion of the reader/writer to a peripheral portion, a strong coupling is obtained between at least one of the coil units and an antenna of the reader/writer. Thus, the communication performance is prevented from being suddenly deteriorated, and a wide communication range for the reader/writer is maintained.

In addition, since a conductor arranged to connect the coil units is disposed in a peripheral portion along a side of the casing, which has a plate shape, of the portable electronic apparatus, the conductor also defines a portion of the coil antenna, thus increasing the loop area. Consequently, an increased gain is obtained, and deterioration in the communication performance due to a deviation from the central portion of the reader/writer is further suppressed.

Other features, elements, steps, characteristics and advantages of the present invention will become more apparent from the following detailed description of preferred embodiments of the present invention with reference to the attached drawings.

BRIEF DESCRIPTION OF DRAWINGS

FIGS. 5A to 5E include illustrations showing the configuration of a coil antenna and a cellular phone including the coil antenna according to a third preferred embodiment of the present invention.

DETAILED DESCRIPTION OF PREFERRED EMBODIMENTS

First Preferred Embodiment

Figure 1:
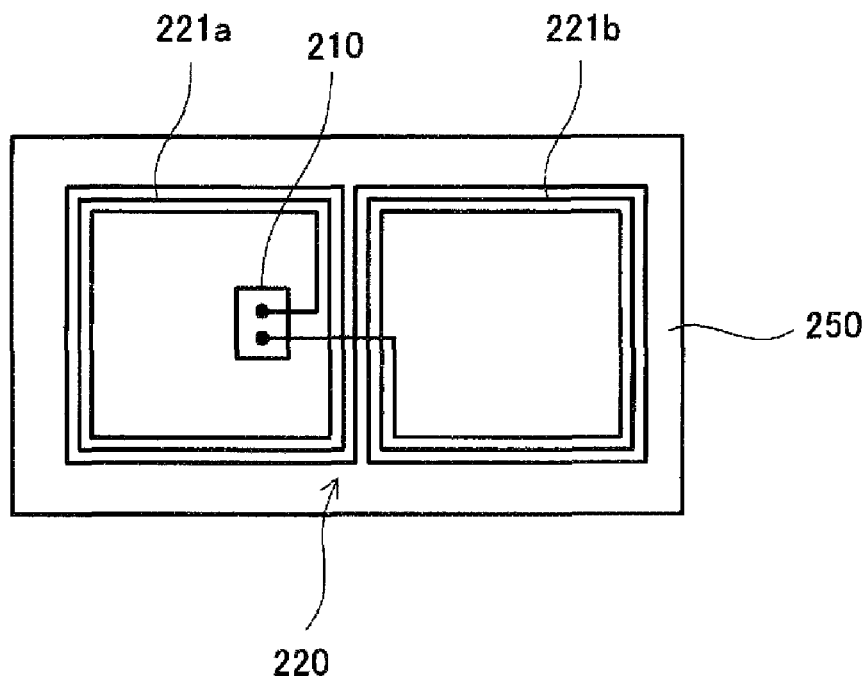
FIG. 1 is an illustration showing an example of a non-contact IC tag of Japanese Unexamined Patent Application Publication No. 2004-126750.
Figure 2:
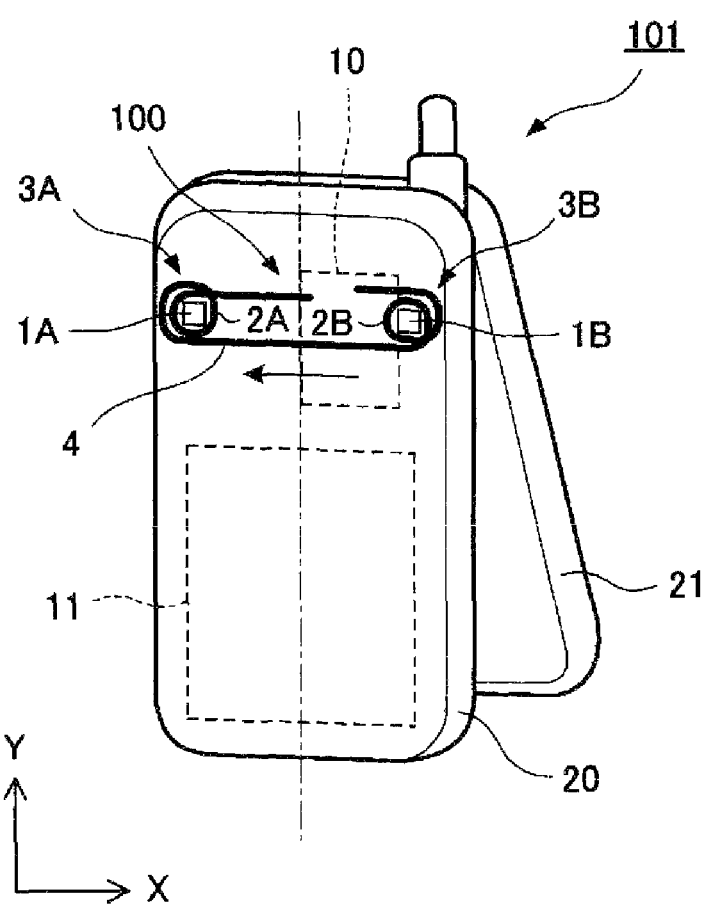
FIG. 2 is an illustration showing the configuration of a coil antenna and a cellular phone including the coil antenna according to a first preferred embodiment of the present invention.

FIG. 2 is an illustration showing the configuration of a cellular phone including a coil antenna according to a first preferred embodiment. The configuration of the cellular phone is illustrated as viewed from a main casing of the cellular phone in a state in which a sub-casing is slightly unfolded with respect to the main casing. The internal configuration of the main casing is represented as a perspective view.

A main casing 20 and a sub-casing 21 each have a plate shape. The main casing 20 and the sub-casing 21 define a clamshell casing that can be folded and unfolded about a side of each of the main casing 20 and the sub-casing 21. The main casing 20 includes a keyboard, and the sub-casing 21 includes a liquid crystal panel.

The main casing 20 includes a coil antenna 100 including two coil units 3A and 3B, an RFID substrate 10, a main casing substrate, which is not shown, a battery pack 11, and other suitable components.

The coil units 3A and 3B include magnetic cores 1A and 1B, which are preferably made of ferrite, for example, and windings 2A and 2B, which are wound around the magnetic cores 1A and 1B, respectively. In the two coil units 3A and 3B, one end of each of the windings 2A and 2B are connected to each other through a conductor 4 and the other end of each of the windings are connected to the RFID substrate 10. The windings 2A and 2B of the two coil units 3A and 3B are connected in series through the conductor 4, such that winding directions of the windings 2A and 2B are the same. The coil axes of the windings 2A and 2B of the coil units 3A and 3B are substantially perpendicular to a main surface of the main casing 20.

The two coil units 3A and 3B are disposed on opposite sides across a center line (a virtual center line) represented by an alternate long and short dash line of the main casing 20 in the drawing such that the coil units 3A and 3B are preferably disposed as far away from the center line as possible.

Figure 3:
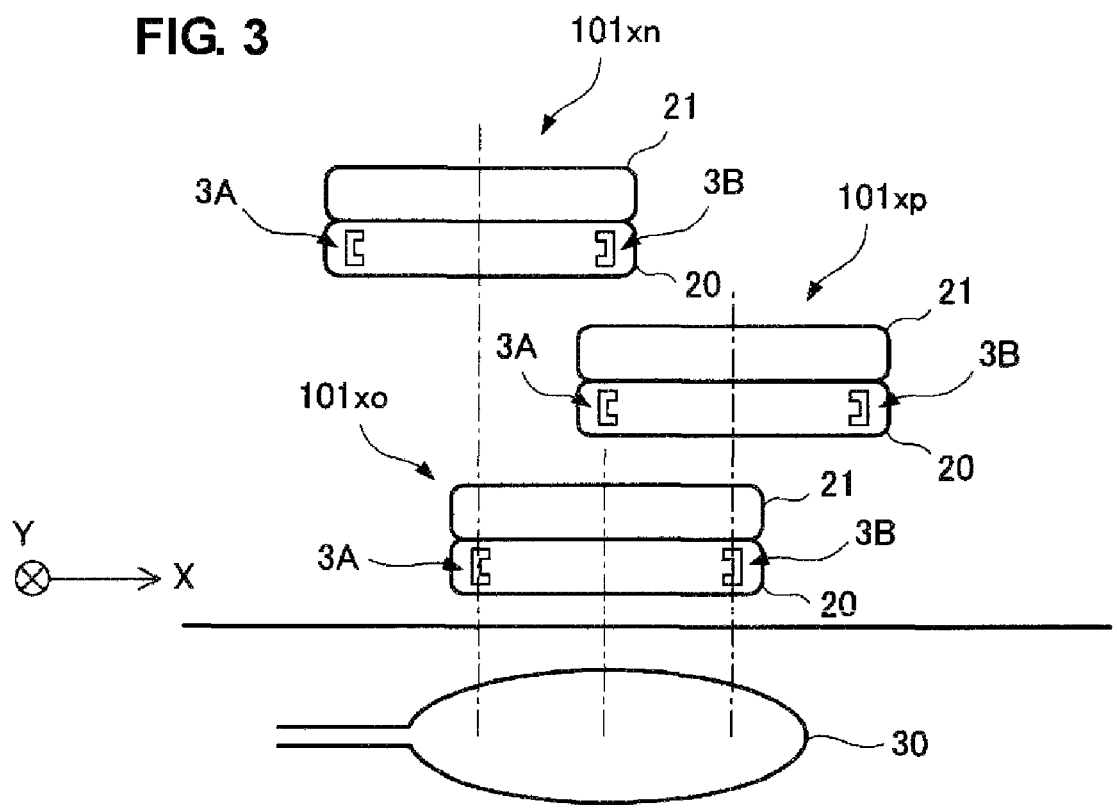
FIG. 3 is an illustration showing positional deviations of cellular phones with respect to a reader/writer.

FIG. 3 is an illustration showing examples of deviations of the location of cellular phones with respect to a reader/writer. A cellular phone 101xo represents a state in which a cellular phone is disposed close to a proper location with respect to a reader/writer antenna 30. In this case, the two coil units 3A and 3B have substantially equal magnetic-field couplings with the reader/writer antenna 30. A cellular phone 101xp represents a state in which a cellular phone is disposed close to a location that is displaced by a predetermined amount in a positive X direction from the center of the reader/writer antenna 30. A cellular phone 101xn represents a state in which a cellular phone is disposed close to a position that is displaced by a predetermined amount in a negative X direction. Although, as shown in FIG. 3, the cellular phones are disposed at different distances from a surface of the reader/writer, the actual distances are substantially the same.

As described above, when the cellular phone 101 is displaced in the X direction from the reader/writer antenna 30, one of the two coil units 3A and 3B is close to the central portion of the reader/writer antenna 30 and has a strong magnetic-field coupling. As a result, the total gain of the coil antenna is not significantly decreased. That is, when a cellular phone is disposed in a location represented by the cellular phone 101xp, although the magnetic-field coupling between the coil unit 3B and the reader/writer antenna 30 is weakened, the magnetic-field coupling between the coil unit 3A and the reader/writer antenna 30 is strengthened. In addition, when a cellular phone is disposed in a location represented by the cellular phone 101xn, although the magnetic-field coupling between the coil unit 3A and the reader/writer antenna 30 is weakened, the magnetic-field coupling between the coil unit 3B and the reader/writer antenna 30 is strengthened.

As described above, even when a cellular phone is disposed close to a reader/writer such that the location of the cellular phone is deviated in the orthogonal direction of the center line from the central portion of the reader/writer, one of the two coil units 3A and 3B achieves a strong coupling with the antenna of the reader/writer. Thus, the communication performance is prevented from being suddenly deteriorated, and a wide communication range for the reader/writer is maintained.

Although the windings 2A and 2B of the two coil units 3A and 3B are preferably connected in series in the first preferred embodiment, the windings 2A and 2B of the two coil units 3A and 3B may be connected in parallel.

Second Preferred Embodiment

Figure 4:
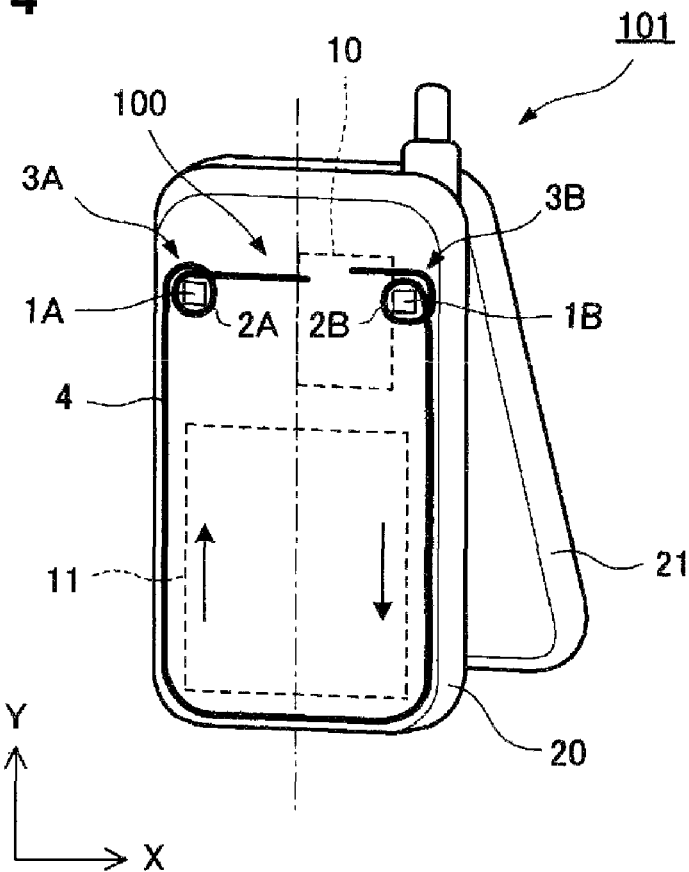
FIG. 4 is an illustration showing the configuration of a coil antenna and a cellular phone including the coil antenna according to a second preferred embodiment of the present invention.

FIG. 4 is an illustration showing the configuration of a cellular phone including a coil antenna according to a second preferred embodiment. The coil antenna shown in FIG. 4 is different from the coil antenna shown in FIG. 2 with respect to the configuration of the conductor 4 connecting the two coil units 3A and 3B. In the preferred embodiment shown in FIG. 4, the conductor 4 through which one ends of the windings 2A and 2B of the two coil units 3A and 3B are connected to each other is disposed in a peripheral portion along three sides of the main casing 20 outside the battery pack 11.

Since the conductor 4 through which the windings of the two coil units 3A and 3B are connected to each other is disposed in the peripheral portion along the sides of the main casing 20, electromagnetic induction is generated not only by magnetic fluxes passing through the magnetic cores 1A and 1B of the coil units 3A and 3B, but also by magnetic fluxes interlinked with the loop surface provided by the conductor 4. Accordingly, the gain of the coil antenna is increased as compared to the first preferred embodiment. In addition, not only in the case of displacement in the direction (X-axis direction) substantially perpendicular to the center line, which is represented by an alternate long and short dash line shown in the drawing, but also in the case of displacement in the center-line direction (Y-axis direction) along the surface direction of the main casing 20, variations in the gain are suppressed. Thus, an acceptable displacement range is increased.

Third Preferred Embodiment

FIGS. 5A to 5E include illustrations showing the configuration of a cellular phone including a coil antenna according to a third preferred embodiment. In the example shown in FIG. 4, the two coil units 3A and 3B are disposed in locations near the RFID substrate 10. However, as shown in FIG. 5A, the length of the conductor 4 through which one ends of the windings in the two coil units 3A and 3B are connected to each other may be less than the length of conductors 4' for connecting the other ends of the windings to the RFID substrate 10.

In the examples shown in FIGS. 2 and 4, the two coil units 3A and 3B are disposed in locations that are substantially symmetrical with respect to the center line, which provides a symmetric axis. However, as shown in FIG. 5B, the two coil units 3A and 3B may be disposed in locations asymmetric with respect to the center line, which is represented by an alternate long and short dash line.

In addition, as shown in FIG. 5C, three coil units 3A, 3B, and 3C may be provided. The number of coil units provided may also be four or more. Furthermore, the numbers of coil units provided on opposite sides of a center line represented by an alternate long and short dash line are not necessarily the same.

In each of the preferred embodiments shown in FIG. 4 and FIGS. 5A to 5C, the center line (virtual center line) represented by the alternate long and short dash line in the corresponding drawing is the long-axis direction of the main surface of the main casing having a plate shape. However, as represented by an alternate long and short dash line in FIG. 5D, a virtual center line may be in the short-axis direction of the main surface of the main casing. That is, as shown in FIG. 5D, the coil units 3A and 3B may be provided on opposite sides of the virtual center line in the short-axis direction of the main surface of the main casing.

In addition, as represented by two alternate long and short dash lines in FIG. 5E, virtual center lines may be in the long-axis direction and the short-axis direction of the main surface of the main casing having a plate shape. That is, as shown in FIG. 5E, the coil units 3A and 3B may be provided on opposite sides of the virtual center line assumed to be in the long-axis direction and the coil units (3A and 3B) and a coil unit 3C may be provided on opposite sides of the virtual center line assumed to be in the short-axis direction.

A coil antenna according to another preferred embodiment of the present invention will be described with reference to FIGS. 6A and 6B.

Figure 6A:
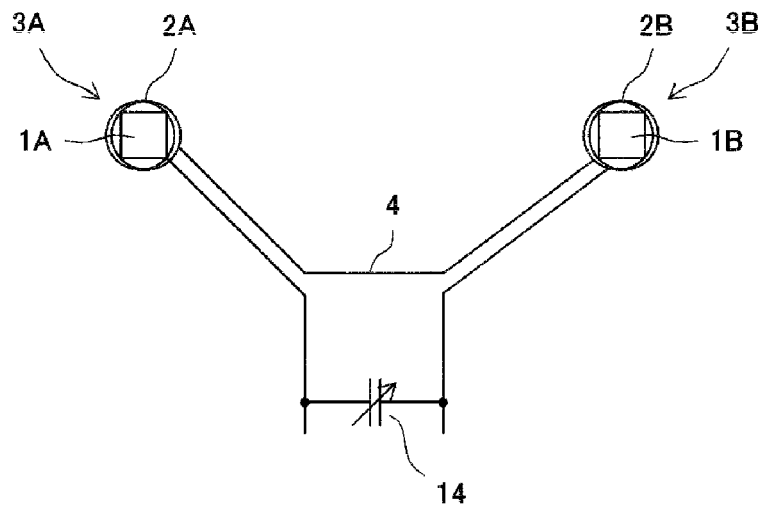
FIGS. 6A and 6B include illustrations showing the configuration of a coil antenna according to a preferred embodiment of the present invention.
Figure 6B:
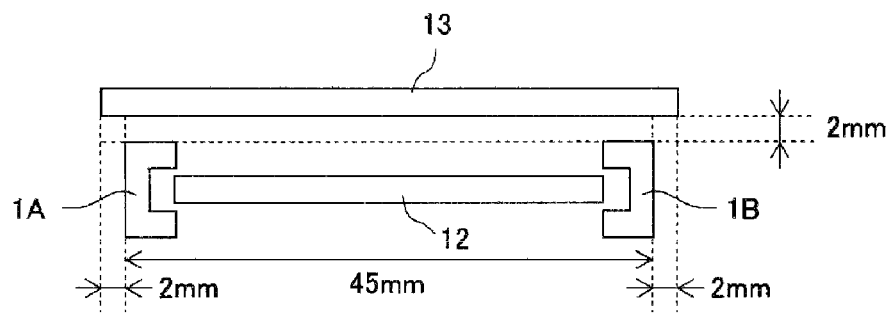

A coil antenna shown in FIGS. 6A and 6B is prepared in order to quantitatively measure the characteristics of a coil antenna including two coil units. FIG. 6A is a plan view of the coil antenna, and FIG. 6B is a sectional view taken in a direction of the thickness of the casing of the coil antenna. The number of turns of each of the windings 2A and 2B of the coil units 3A and 3B preferably is six, for example. A resonant-frequency adjusting capacitor 14 is connected to a series circuit including the two coil units 3A and 3B, which are connected to each other through the conductor 4. The capacitance of the capacitor 14 is adjusted such that the resonant frequency of the coil antenna preferably is about 13.56 MHz, for example.

A metal plate 12, which is assumed to be a keyboard substrate within the main casing, is disposed between the magnetic cores 1A and 1B of the two coil units 3A and 3B. In addition, a metal plate 13, which is assumed to be the frame of a liquid crystal panel of the sub-casing, is disposed in a position that is substantially parallel to the metal plate 12. The positional relationship of the two magnetic cores 1A and 1B and the metal plates 12 and 13 is represented as shown by dimensions provided in the drawing.

Figure 7:
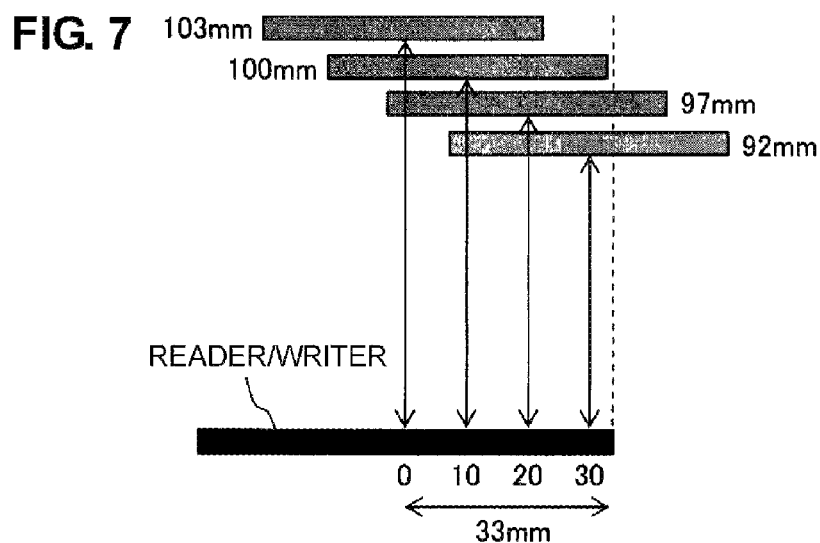
FIG. 7 illustrates the relationship between the positional deviation of the coil antenna and the maximum communication range.

FIG. 7 illustrates the relationship between the location of a coil antenna with respect to a reader/writer and the maximum communication range. When the center of the read position of the reader/writer (the center of the reader/writer antenna) corresponds to the center of the coil antenna, the maximum communication range is about 103 mm. In the case of a positional displacement of about 30 mm, the maximum possible communication range is about 92 mm. The positional displacement of the coil antenna of the cellular phone with respect to the reader/writer is about ±33 mm. As described above, the gain is reduced by only about 10% for the maximum displacement of the cellular phone which occurs in normal use. Thus, the allowable displacement range of a cellular phone that is to be disposed close to a reader/writer is significantly increased.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A coil antenna to be provided in a casing of a portable electronic apparatus, the casing having a plate shape and having a first main surface and a second main surface that faces the first main surface and is substantially parallel to the first main surface, the coil antenna comprising:
   an RFID substrate; and
   a plurality of coil units, each of the plurality of coil units including a winding, and each of the plurality of coil units being connected to the RFID substrate; wherein
   the winding of one of the plurality of coil units and the winding of another of the plurality of coil units are disposed on opposite sides of a virtual center line extending in one of a long-axis direction and a short-axis direction of the main surfaces of the casing; and
   the windings of the plurality of coil units are connected to one another by a conductor, such that winding directions of the windings of the plurality of coil units are the same.

2. The coil antenna according to claim 1, wherein a coil axis of the windings of each of the plurality of coil units is substantially perpendicular to the main surfaces of the casing.

3. The coil antenna according to claim 1, wherein the conductor is disposed in a peripheral portion of the casing along at least one side of the casing.

4. The coil antenna according to claim 3, wherein the conductor is disposed in a peripheral portion of the case along three sides of the casing.

5. The coil antenna according to claim 1, wherein the plurality of coil units includes at least three coil units.

6. A portable electronic apparatus including comprising:
   a casing having a plate shape and including a first main surface and a second main surface that faces the first main surface and is substantially parallel to the first main surface: and
   a coil antenna including:
      an RFID substrate; and
      a plurality of coil units, each of the plurality of coil units including a winding, and each of the plurality of coil units being connected to the RFID substrate; wherein
   the winding of one of the plurality of coil units and the winding of another of the plurality of coil units are disposed on opposite sides of a virtual center line extending in one of a long-axis direction and a short-axis direction of the main surfaces of the casing; and
   the windings of the plurality of coil units are connected to one another by a conductor, such that winding directions of the windings of the plurality of coil units are the same.

* * * * *